United States Patent [19]

Fujinaga

[11] Patent Number: 4,553,619
[45] Date of Patent: Nov. 19, 1985

[54] ELECTRONIC BALANCE WITH AVERAGING FEATURE FOR VIBRATION ERROR CORRECTION

[75] Inventor: Yasuhiro Fujinaga, Kyoto, Japan
[73] Assignee: Shimadzu Corporation, Kyoto, Japan
[21] Appl. No.: 622,834
[22] Filed: Jun. 21, 1984

[30] Foreign Application Priority Data

Jun. 30, 1983 [JP] Japan ................................ 58-120005

[51] Int. Cl.$^4$ ........................ G01G 23/10; G01G 9/00
[52] U.S. Cl. ........................................ 177/185; 177/1; 177/25; 364/734
[58] Field of Search ............................. 177/185, 25, 1; 364/567, 734

[56] References Cited

U.S. PATENT DOCUMENTS

| | | | |
|---|---|---|---|
| 3,478,328 | 11/1969 | Schillinger | 364/734 X |
| 3,826,319 | 7/1974 | Loshbough | 177/25 |
| 4,043,412 | 8/1977 | Rock | 177/25 |
| 4,347,903 | 9/1982 | Yano et al. | 177/25 |
| 4,352,094 | 9/1982 | Reneric | 364/734 X |
| 4,375,838 | 3/1983 | Yano et al. | 364/567 X |

*Primary Examiner*—E. A. Goldberg
*Assistant Examiner*—Patrick W. Foster
*Attorney, Agent, or Firm*—Koda and Androlia

[57] ABSTRACT

An electronic balance which displays a correct weight value by averaging the digitized weight data outputted at predetermined time intervals from a weight detector provided in the balance. The weight data averaging to give a correct value is carried out with the number of the basis data for averaging increased each time a new weight data is obtained, after the weight data, which are largely fluctuating in the beginning, have been considered to be stabilized by being settled down in a predetermined limit. In case the once stabilized weight data are brought back into a fluctuating state owing to any external disturbance, such fluctuation is detected and the again unstabilized weight data are excluded from the averaging to give a correct weight value.

2 Claims, 5 Drawing Figures

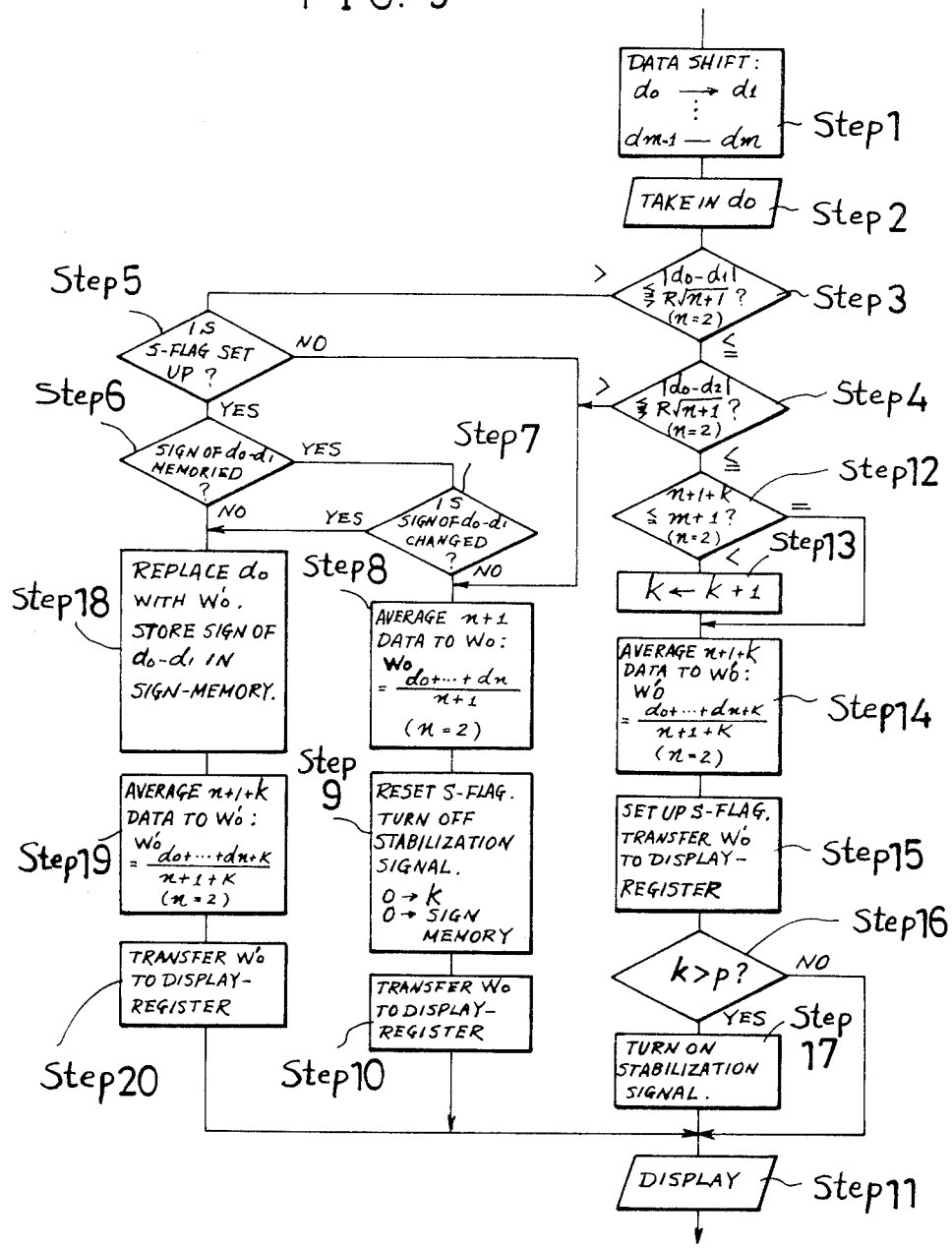

ial figures of measured weight values, and also
ELECTRONIC BALANCE WITH AVERAGING FEATURE FOR VIBRATION ERROR CORRECTION

BACKGROUND OF THE INVENTION

The present invention relates to an electronic balance, and more particularly to a highly-sensitive electronic balance improved in the rapidity of displaying the correct value of a measured weight.

An electronic balance, particularly a highly sensitive one, which is sensitive also to an external disturbance, generally takes a long time until the balance becomes stabilized to give the correct value of a weight to be measured. To overcome such a drawback a conventional highly sensitive balance is usually devised to display the weight value by averaging a number of fluctuating weight value data outputted from the weight detector in the balance after the data fluctuations having decreased within a predetermined region. An example of such an electronic balance is disclosed in the U.S. Pat. No. 4,347,903. However, the method of only averaging the weight data can not always satisfactorily comply with a requirement for rapidly determining the value of a measured weight, particularly in case of weighing out a predetermined weight by adding or subtracting the samples on the weighing tray of the balance, because the decreasing fluctuations of the weight data are again violated each time the samples are added or subtracted. In addition the method has a disadvantage that the averaging process is adversely affected by erroneous weight data due to such an unexpected external disturbance as a small vibration which may be encountered during a normally decreasing process of the weight data fluctuations.

OBJECTS AND SUMMARY OF THE INVENTION

The present invention aims at resolving the above disadvantages involved in the highly sensitive electronic balance based on a prior art, and makes it an object to provide a highly sensitive electronic balance which is made capable of displaying a correct weight value as rapidly as possible by being provided with a means for judging whether or not the fluctuation of the weight value data outputted from the weight detector remains within a limit at which the weight value data can make the average give a correct value of the weight to be measured.

Another object of the present invention is to provide an improved electronic balance made free from displaying an erroneous weight value owing to an external disturbance which may be encountered to disturb which disturbs the weight value data again after their fluctuations have once settled down within said limit.

The operation and schematic constitution of the electronic balance based on the present invention is briefed in the following in reference to FIG. 1. The weight value data outputted from a weight detector 2 are successively sampled at predetermined time intervals and stored in a data memory 1. At each time of data sampling a data-difference calculator 3 calculates the differences between a latest sampled data $d_0$ and the data $d_n$, $d_{n-1}, \ldots, d_1$ of a predetermined number n having successively sampled and stored preceding to the latest data $d_0$. If all the calculated differences satisfy an equation:

$$|d_j - d_0| \leq R\sqrt{n+1}, \quad (1)$$

where R is the sensitivity of the balance and j stands for n, n−1, ..., 1, a stabilized-data discriminator 4 judges the data $d_n$, $d_{n-1}, \ldots, d_1$, $d_0$ to be stabilized. If the equation is not satisfied for at least one value of j the data are judged to be fluctuating. In case the data are judged to be fluctuating, the n+1 data $d_n$, $d_{n-1}, \ldots, d_1$, $d_0$ are averaged to $W_0$ by a first data-averaging means 5. The average $W_0$ is transferred to a displayer 6 and displayed thereon. On the other hand, if the data are judged to be stabilized, the averaging is taken over by a second data-averaging means 7, which, so long as the data continues to be stabilized, averages the data to $W_0'$ with the number of the basis data for averaging increased one by one each time a new "latest" data $d_0$ is sampled. In case a data $d_0$ which does not satisfy the above equation is sampled after the data have already come to be stabilized in the preceding samplings, the "disturbed" data $d_0$ is judged by an external-disturbance detector 8 to be due to any external disturbance, and further if such a disturbed data $d_0$ is repeatedly obtained with the difference $d_0 - d_1$ kept in the same sign, the external-disturbance detector 8 judges the data to have been brought back into a fluctuating state from the stabilized state. Once the data $d_0$ is judged to have been disturbed again, a disturbed-value neglector excludes it from the sampled data stored in the data memory 1, and substitute the data with the average $W_0'$ obtained in the preceding averaging process. Therefore, the averaging in this case is carried out with that preceding $W_0'$ used instead of $d_0$.

BRIEF DESCRIPTION OF THE DRAWINGS

The present invention will be further described in detail in reference to the accompanying drawings, in which:

FIG. 3 is the flow chart of the program memoried in the ROM provided in the above embodiment.

DETAILED DESCRIPTION OF THE INVENTION

Figure 1:
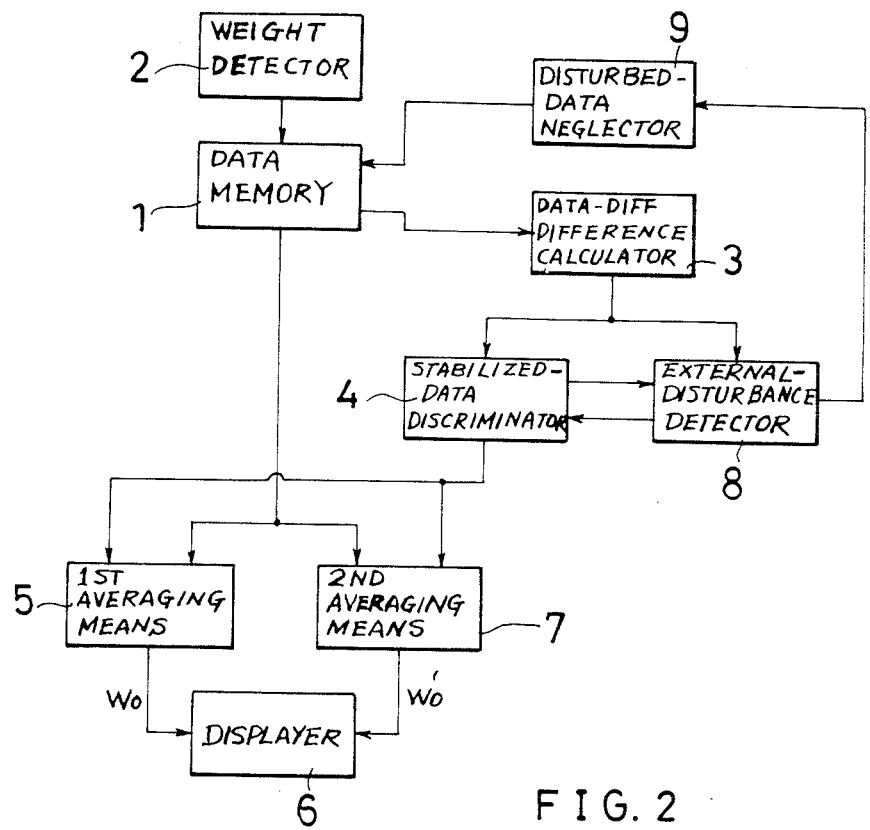
FIG. 1 is a block-diagrammatic representation for showing the functional principle of the present invention.
Figure 2:
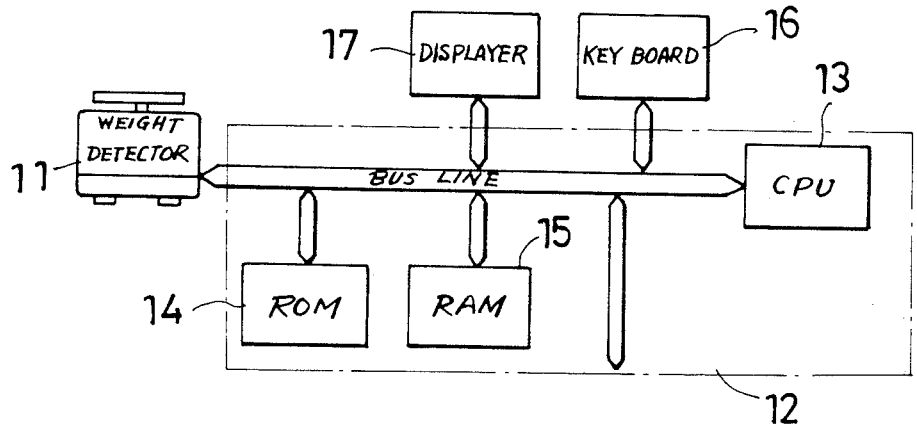
FIG. 2 block-dial agramatically shows the constitution of the present invention.

Referring to FIG. 2 a weight detector 11 outputs the detected weight values as digitized weight data at predetermined short time intervals such as 0.2 msec. The weight data are inputted to a microcomputer 12, which consists of a PCU 13, a ROM 14 and a RAM 15 communicating with one another through a bus line. The RAM 15 has, as multi-register, various areas to store said weight data and the results of various calculations to be executed according to the program stored in the ROM 14 for controlling the entire function of this embodiment. The microcomputer 12 is further connected with a key-board 16 for setting the initial conditions of weighing operation, a displayer 17 for displaying the numerical figures of measured weight values, and also with an output port provided for outputting the weight data, if necessary, out of the device.

In the above constitution the weighing function of this embodiment is described with reference made also to the flow chart shown in FIG. 3. With a weight loaded on the weighing tray the weight detector 11 outputs time-varying or fluctuating weight data. The weight data are inputted to the microcomputer 12 and successively stored in the RAM 5, which can store the weight data up to the number $m+1$. Each time a new datum is inputted, all of the previously stored data $d_j$ ($j=0, 1, \ldots, m-1$) are shifted to $d_{j+1}$ with the oldest data disposed of, and the newest one is taken in as $d_0$ (Steps 1 and 2 in FIG. 3). With a new datum $d_0$ thus taken in, the differences $d_j-d_0$ are calculated to confirm whether the previously mentioned equation (1) is satisfied or not, the confirmation is carried out over a predetermined number n of the data $d_j$ ($j=1, 2, \ldots, n$). In the present embodiment the number n is chosen to be 2, which number n ($=2$) has been inputted in advance in the computer through the operation of the key-board 16 together with R (sensitivity of the balance). In FIG. 3, Steps 3 and 4 judge whether $d_1-d_0$ and $d_2-d_0$ satisfy the equation (1) or not.

In case the equation (1) is not satisfied, the weight data $d_2$, $d_1$, $d_0$ are judged to be still "unstabilized", and Steps 3 and 4 are then followed by Step 8, where an average $W_0$ is calculated from the weight data $d_2$, $d_1$ and $d_0$. The average $W_0$ is displayed (Step 11) as an unstabilized "erroneous" weight value.

In case the equation (1) comes to be satisfied, the weight data are judged to have become "stabilized", and the process of the flow chart then proceeds from Step 4 to Step 11 through Steps 12, 13, 14, 15, 16 and 17. At Step 14 an average $W_0'$ is calculated over the obtained weight data with the number of the basis data for averaging increased (Step 13) at each time of $d_0$-sampling until the increased number of the basis data reaches $m+1$ (Step 12). The average $W_0'$ is displayed (Step 11) as a weight value calculated with "stabilized" weight data. In this process a data stabilization indicating flag (S-FLAG) is set up at Step 15, and further if said increased number of the basis data for averaging exceeds a predetermined number (Step 16), a stabilization indicating signal is generated at Step 17. With this signal generated, the numerical figures or decimal point of the displayed weight value is made flicker to indicate the weight value is obtained with "extremely stabilized" weight data.

If, after the weight data having been stabilized, a new data $d_0$ the difference of which from the preceding data $d_1$ does not satisfy the equation (1) is suddenly encountered, and so long as that data $d_0$ is of the first time after the preceding data stabilization, Step 3 is followed through Steps 5 and 6 by Step 18. At Step 18 the data $d_0$ is replaced with the just previously calculated average $W_0'$ to use it instead of $d_0$ in the average calculation at Step 19. In addition the sign of $d_0-d_1$ is memorized at Step 18. An average $W_0'$ calculated at Step 19 with the use of said previous $W_0'$ (instead of $d_0$) is considered to be an average obtained with "stabilized" weight data, and displayed at the displayer (Step 11).

However, in case such a disturbed $d_0$ is successively obtained, the flow chart process proceeds from Step 3 to Step 7 through Steps 5 and 6. At Step 7 the sign of $d_0-d_1$ in this occasion is compared with that already memorized at Step 18 in the preceding occasion. If both the signs are identical, Step 7 is followed by Step 18, and an average is calculated at Step 19 similarly to the above case in which the disturbed data $d_0$ is of the first time after the preceding data stabilization. On the contrary, if the signs are different from each other, the weight data are judged to have become "unstabilized" again, and Step 7 is followed by Step 8. The process after Step 8 is similar to the case in which the weight data were not stabilized in the beginning. Therefore, the displayed weight value is considered to be erroneous.

Figure 4A:
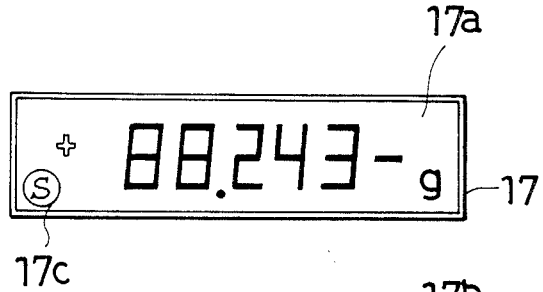
FIG. 4 shows patterns of the display of unstabilized weight values.
Figure 4B:
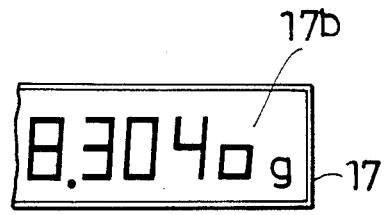

In the above-described embodiment, it is convenient to distinguish the display of still fluctuating weight values ($W_0$) based on unstabilized weight data from that of correct weight values ($W_0'$) based on stabilized weight data. For this purpose the displayer 17 can be designed so that, for instance, the last numerical figure of $W_0$ may be replaced with a bar sign 17a as is shown in FIG. 4(a), or may be represented by a small-sized zero sign 17b in FIG. 4(b). In addition, flickerring of the display to indicate the "extreme" stabilization of weight data can also be replaced with flickerring of a lamp 7c (in FIG. 4(a)) provided on the displayer panel.

It will be easily understood from the above description that the present invention provides an improved electronic balance capable of rapidly displaying a correct weight value, because, each time a new weight data is sampled, the data stabilization is examined. In addition, even if the once established weight data stability is violated by any external disturbance, the unstabilized state of weight data is immediately detected, so that the electronic balance based on the present invention is made free from giving an incorrect weight value due to an external disturbance.

What is claimed is:

1. An electronic balance comprising:
   a data memory for storing the weight data sampled at predetermined time intervals from the output of the weight detecting means provided in said electronic balance;
   a data difference calculating means for calculating the differences between a newest weight data $d_0$ and the data $d_n, d_{n-1}, \ldots, d_1$ of a predetermined number n continually preceding to said newest weight data $d_0$;
   a data stabilization judging means for judging the $n+1$ data $d_n, d_{n-1}, \ldots, d_1$ to be stabilized, if an equation $|d_j-d_0| \leq R\sqrt{n+1}$ is satisfied, where R is the sensitivity of said electronic balance and j stands for $1, 2, \ldots, n$;
   a first data-averaging means for calculating, when said $n+1$ weight data are not judged to be stabilized, an average $W_0$ over said $n+1$ weight data;
   a second data-averaging means for calculating, when said $n+1$ weight data are judged to be stabilized, an average $W_0'$ with the basis data for averaging increased one by one at each time a new weight data $d_0$ is sampled;
   an external-disturbance judging means for judging, if a new weight data $d_0$ which does not satisfy said equation is sampled after the preceding weight data have been judged to be stabilized, said new weight data to be due to an external disturbance, and for judging the weight data to have been brought into an unstabilized state, so long as such a weight data as said new weight data which does not satisfy said equation is successively sampled;
   a disturbed-data disposing means for displacing, when a weight data is judged to be due to an external disturbance, with the average $W_0'$ calculated when the weight data just preceding to said weight data judged to be due to an external disturbance was sampled; and a displaying means for displaying said $W_0$ or said $W_0'$.

2. An electronic balance defined in claim 1, wherein said displaying means is devised to display the last numerical figure of said $W_0$ in a shape different from that of said $W_0'$ for the purpose of indicating said $W_0$ is obtained from unstabilized weight data.

* * * * *